United States Patent
Nguyen et al.

(10) Patent No.: US 7,712,531 B2
(45) Date of Patent: *May 11, 2010

(54) METHODS FOR CONTROLLING PARTICULATE MIGRATION

(75) Inventors: Philip D. Nguyen, Duncan, OK (US); Ronald G. Dusterhoft, Katy, TX (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/828,757

(22) Filed: Jul. 26, 2007

(65) Prior Publication Data
US 2007/0261854 A1    Nov. 15, 2007

Related U.S. Application Data

(63) Continuation of application No. 10/862,986, filed on Jun. 8, 2004, now Pat. No. 7,299,875.

(51) Int. Cl.
*E21B 33/138* (2006.01)

(52) U.S. Cl. .................. 166/295; 166/297; 166/300

(58) Field of Classification Search ............... None
See application file for complete search history.

(56) References Cited

U.S. PATENT DOCUMENTS

| | | | |
|---|---|---|---|
| 2,238,671 A | 4/1941 | Woodhouse ............... 166/21 |
| 2,703,316 A | 3/1955 | Schneider ............... 260/78.3 |
| 2,869,642 A | 1/1959 | McKay et al. ............... 166/4 |
| 3,047,067 A | 7/1962 | Williams et al. ............... 166/33 |
| 3,052,298 A | 9/1962 | Malott | |
| 3,070,165 A | 12/1962 | Stratton | |
| 3,123,138 A | 3/1964 | Robichaux ............... 166/33 |
| 3,173,484 A | 3/1965 | Huitt et al. | |
| 3,176,768 A | 4/1965 | Brandt et al. ............... 166/33 |
| 3,195,635 A | 7/1965 | Fast | |
| 3,199,590 A | 8/1965 | Young ............... 166/33 |
| 3,272,650 A | 9/1966 | MacVittie ............... 134/7 |
| 3,297,086 A | 1/1967 | Spain ............... 166/33 |
| 3,302,719 A | 2/1967 | Fischer | |
| 3,308,885 A | 3/1967 | Sandiford ............... 166/33 |
| 3,308,886 A | 3/1967 | Evans | |
| 3,316,965 A | 5/1967 | Watanabe ............... 166/33 |
| 3,329,204 A | 7/1967 | Brieger | |
| 3,336,980 A | 8/1967 | Rike ............... 166/33 |
| 3,364,995 A | 1/1968 | Atkins et al. | |
| 3,366,178 A | 1/1968 | Malone et al. | |
| 3,375,872 A | 4/1968 | McLaughlin et al. ........... 166/29 |
| 3,378,074 A | 4/1968 | Kiel | |
| 3,404,735 A | 10/1968 | Young et al. ............... 166/33 |
| 3,415,320 A | 12/1968 | Young ............... 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. ............... 117/62.2 |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham ............... 166/280 |
| 3,681,287 A | 8/1972 | Brown et al. ............... 260/67 |
| 3,708,013 A | 1/1973 | Dismukes ............... 166/276 |
| 3,709,298 A | 1/1973 | Pramann ............... 166/276 |
| 3,709,641 A | 1/1973 | Sarem | |
| 3,741,308 A | 6/1973 | Veley | |
| 3,754,598 A | 8/1973 | Holloway, Jr. ............... 166/249 |
| 3,765,804 A | 10/1973 | Brandon ............... 417/540 |
| 3,768,564 A | 10/1973 | Knox et al. ............... 166/307 |
| 3,769,070 A | 10/1973 | Schilt | |

(Continued)

FOREIGN PATENT DOCUMENTS

CA    2063877    5/2003

(Continued)

OTHER PUBLICATIONS

Halliburton, *CoalStm*[SM] *Service, Helps Boost Cash Flow From CBM Assets*, Stimulation, HO3679 10/03, 2003, Halliburton Communications.

(Continued)

*Primary Examiner*—Zakiya W. Bates
(74) *Attorney, Agent, or Firm*—Robert A. Kent; Baker Botts LLP

(57) ABSTRACT

Methods are provided for stabilizing a portion of a subterranean formation or reducing the production of particulates from a portion of a subterranean formation comprising contacting the portion of the subterranean formation with a pre-flush fluid; contacting the portion of the subterranean formation with a consolidation fluid comprising a resin and an aqueous dissolvable solvent; and, contacting the portion of the subterranean formation with an after-flush fluid. Other methods are provided for fracturing a portion of a subterranean formation while controlling particulates comprising contacting the portion of the subterranean formation with a pre-flush fluid; contacting the portion of the subterranean formation with a consolidation fluid comprising a resin and an aqueous dissolvable solvent; and, contacting the portion of the subterranean formation with a fracturing fluid at a pressure sufficient to create or enhance a fracture in the subterranean formation.

17 Claims, No Drawings

U.S. PATENT DOCUMENTS

| | | | |
|---|---|---|---|
| 3,784,585 A | 1/1974 | Schmitt et al. ............... 260/861 |
| 3,819,525 A | 6/1974 | Hattenbrun ................ 252/132 |
| 3,828,854 A | 8/1974 | Templeton et al. .......... 166/307 |
| 3,842,911 A | 10/1974 | Know et al. ................. 166/307 |
| 3,850,247 A | 11/1974 | Tinsley |
| 3,854,533 A | 12/1974 | Gurley et al. ............... 166/276 |
| 3,857,444 A | 12/1974 | Copeland .................... 166/276 |
| 3,861,467 A | 1/1975 | Harnsberger |
| 3,863,709 A | 2/1975 | Fitch ............................ 165/1 |
| 3,868,998 A | 3/1975 | Lybarger et al. ............. 166/278 |
| 3,888,311 A | 6/1975 | Cooke, Jr. .................... 166/280 |
| 3,902,557 A | 9/1975 | Shaughnessy et al. ....... 166/295 |
| 3,912,692 A | 10/1975 | Casey et al. ................. 260/78.3 |
| 3,933,205 A | 1/1976 | Kiel |
| 3,948,672 A | 4/1976 | Harnberger .................. 106/90 |
| 3,955,993 A | 5/1976 | Curtice ........................ 106/90 |
| 3,960,736 A | 6/1976 | Free et al. ............... 252/8.55 R |
| 4,000,781 A | 1/1977 | Knapp |
| 4,008,763 A | 2/1977 | Lowe et al. ................. 166/253 |
| 4,015,995 A | 4/1977 | Hess ........................ 106/287 |
| 4,018,285 A | 4/1977 | Watkins et al. |
| 4,029,148 A | 6/1977 | Emery ..................... 166/250.1 |
| 4,031,958 A | 6/1977 | Sandiford et al. ........... 166/270 |
| 4,042,032 A * | 8/1977 | Anderson et al. ........... 166/276 |
| 4,060,988 A | 12/1977 | Arnold |
| 4,068,718 A | 1/1978 | Cooke, Jr. et al. |
| 4,070,865 A | 1/1978 | McLaughlin .................... 61/36 |
| 4,074,760 A | 2/1978 | Copeland et al. ............. 166/276 |
| 4,085,801 A | 4/1978 | Sifferman .................... 166/295 |
| 4,085,802 A | 4/1978 | Sifferman et al. |
| 4,089,437 A | 5/1978 | Chutter et al. |
| 4,127,173 A | 11/1978 | Watkins et al. ............... 166/276 |
| 4,169,798 A | 10/1979 | DeMartino ............. 252/8.55 R |
| 4,172,066 A | 10/1979 | Zweigle et al. ........ 260/29.6 TA |
| 4,245,702 A | 1/1981 | Haafkens et al. ............. 166/307 |
| 4,247,430 A | 1/1981 | Constien |
| 4,259,205 A | 3/1981 | Murphey |
| 4,273,187 A | 6/1981 | Satter et al. ................. 166/250 |
| 4,291,766 A | 9/1981 | Davies et al. ............... 166/276 |
| 4,305,463 A | 12/1981 | Zakiewicz ................... 106/245 |
| 4,336,842 A | 6/1982 | Graham et al. ............. 166/276 |
| 4,352,674 A | 10/1982 | Fery ............................ 23/230 |
| 4,353,806 A | 10/1982 | Canter et al. ................ 507/229 |
| 4,387,769 A | 6/1983 | Erbstoesser et al. ......... 166/295 |
| 4,392,988 A | 7/1983 | Dobson et al. |
| 4,399,866 A | 8/1983 | Dearth |
| 4,415,805 A | 11/1983 | Fertl et al. ................... 250/260 |
| 4,428,427 A | 1/1984 | Friedman |
| 4,439,489 A | 3/1984 | Johnson et al. ............. 428/404 |
| 4,441,556 A | 4/1984 | Powers et al. |
| 4,443,347 A | 4/1984 | Underdown et al. ..... 252/8.55 R |
| 4,460,052 A | 7/1984 | Gockel ........................ 175/72 |
| 4,470,915 A | 9/1984 | Conway ................ 252/8.55 R |
| 4,493,875 A | 1/1985 | Beck et al. .................. 428/403 |
| 4,494,605 A | 1/1985 | Wiechel et al. .............. 166/284 |
| 4,498,995 A | 2/1985 | Gockel ................. 252/8.5 LC |
| 4,501,328 A | 2/1985 | Nichols ...................... 166/288 |
| 4,526,695 A | 7/1985 | Erbstosser et al. ....... 252/8.55 R |
| 4,527,627 A | 7/1985 | Graham et al. .............. 166/280 |
| 4,541,489 A | 9/1985 | Wu ............................. 166/312 |
| 4,546,012 A | 10/1985 | Brooks ....................... 427/213 |
| 4,553,596 A | 11/1985 | Graham et al. .............. 166/295 |
| 4,564,459 A | 1/1986 | Underdown et al. ..... 252/8.55 R |
| 4,572,803 A | 2/1986 | Yamazoe et al. ............. 534/16 |
| 4,585,064 A | 4/1986 | Graham et al. .............. 166/280 |
| 4,649,998 A | 3/1987 | Friedman .................... 166/294 |
| 4,664,819 A | 5/1987 | Glaze et al. ............. 252/8.551 |
| 4,665,988 A | 5/1987 | Murphey et al. ............ 166/295 |
| 4,669,543 A | 6/1987 | Young ........................ 166/276 |
| 4,670,501 A | 6/1987 | Dymond et al. |
| 4,675,140 A | 6/1987 | Sparks et al. ................. 264/4.3 |
| 4,681,165 A | 7/1987 | Bannister |
| 4,683,954 A | 8/1987 | Walker et al. ............... 166/307 |
| 4,694,905 A | 9/1987 | Armbruster ................. 166/280 |
| 4,715,967 A | 12/1987 | Bellis et al. .............. 252/8.551 |
| 4,716,964 A | 1/1988 | Erbstoesser et al. ......... 166/284 |
| 4,733,729 A | 3/1988 | Copeland .................... 166/276 |
| 4,739,832 A | 4/1988 | Jennings, Jr. et al. ........ 166/299 |
| 4,772,646 A | 9/1988 | Harms et al. |
| 4,777,200 A | 10/1988 | Dymond et al. |
| 4,785,884 A | 11/1988 | Armbruster ................. 166/280 |
| 4,787,453 A | 11/1988 | Hewgill et al. ........... 166/272.3 |
| 4,789,105 A | 12/1988 | Hosokawa et al. ............ 241/67 |
| 4,796,701 A | 1/1989 | Hudson et al. ............... 166/278 |
| 4,797,262 A | 1/1989 | Dewitz ....................... 422/142 |
| 4,800,960 A | 1/1989 | Friedman et al. ............. 166/276 |
| 4,809,783 A | 3/1989 | Hollenbeck et al. .......... 166/307 |
| 4,817,721 A | 4/1989 | Pober ......................... 166/295 |
| 4,829,100 A | 5/1989 | Murphey et al. ............ 523/131 |
| 4,838,352 A | 6/1989 | Oberste-Padtberg et al. 166/291 |
| 4,842,070 A | 6/1989 | Sharp |
| 4,842,072 A | 6/1989 | Friedman et al. ............. 166/295 |
| 4,843,118 A | 6/1989 | Lai et al. ..................... 524/555 |
| 4,848,467 A | 7/1989 | Cantu et al. ................. 166/281 |
| 4,848,470 A | 7/1989 | Korpics ...................... 166/312 |
| 4,850,430 A | 7/1989 | Copeland et al. ............ 166/276 |
| 4,875,525 A | 10/1989 | Mana |
| 4,886,354 A | 12/1989 | Welch et al. .................. 356/70 |
| 4,888,240 A | 12/1989 | Graham et al. ............... 428/403 |
| 4,892,147 A | 1/1990 | Jennings, Jr. et al. |
| 4,895,207 A | 1/1990 | Friedman et al. ............. 166/276 |
| 4,898,750 A | 2/1990 | Friedman et al. |
| 4,903,770 A | 2/1990 | Friedman et al. ............. 166/288 |
| 4,921,576 A | 5/1990 | Hurd |
| 4,934,456 A | 6/1990 | Moradi-Araghi ............ 166/270 |
| 4,936,385 A | 6/1990 | Weaver et al. ............... 166/288 |
| 4,942,186 A | 7/1990 | Murphey et al. ............ 523/131 |
| 4,957,165 A | 9/1990 | Cantu et al. ................. 166/295 |
| 4,959,432 A | 9/1990 | Fan et al. .................... 526/287 |
| 4,961,466 A | 10/1990 | Himes et al. ................. 166/250 |
| 4,969,522 A | 11/1990 | Whitehurst et al. ......... 166/278 |
| 4,969,523 A | 11/1990 | Martin et al. ................ 166/278 |
| 4,984,635 A | 1/1991 | Cullick et al. |
| 4,986,353 A | 1/1991 | Clark et al. ................. 166/279 |
| 4,986,354 A | 1/1991 | Cantu et al. ................. 166/279 |
| 4,986,355 A | 1/1991 | Casad et al. ................. 166/295 |
| 5,030,603 A | 7/1991 | Rumpf et al. ................ 501/127 |
| 5,049,743 A | 9/1991 | Taylor, III et al. ........... 250/303 |
| 5,056,597 A | 10/1991 | Stowe, III et al. |
| 5,082,056 A | 1/1992 | Tackett, Jr. .................. 166/295 |
| 5,095,987 A | 3/1992 | Weaver et al. |
| 5,105,886 A | 4/1992 | Strubhar ................... 166/280.1 |
| 5,107,928 A | 4/1992 | Hilterhaus .................... 166/293 |
| 5,128,390 A | 7/1992 | Murphey et al. ............ 523/130 |
| 5,135,051 A | 8/1992 | Fracteau et al. ............. 166/104 |
| 5,142,023 A | 8/1992 | Gruber et al. ............... 528/354 |
| 5,165,438 A | 11/1992 | Fracteau et al. ................ 137/1 |
| 5,173,527 A | 12/1992 | Calve .......................... 524/74 |
| 5,178,218 A | 1/1993 | Dees ........................ 166/281 |
| 5,182,051 A | 1/1993 | Bandy et al. ................ 252/645 |
| 5,199,491 A | 4/1993 | Kutta et al. .................. 166/276 |
| 5,199,492 A | 4/1993 | Surles et al. ................. 166/295 |
| 5,211,234 A | 5/1993 | Floyd ......................... 166/276 |
| 5,216,050 A | 6/1993 | Sinclair ....................... 524/108 |
| 5,218,038 A | 6/1993 | Johnson et al. .............. 524/541 |
| 5,232,955 A | 8/1993 | Csabai et al. .................. 521/63 |
| 5,232,961 A | 8/1993 | Murphey et al. ............ 523/414 |
| 5,238,068 A | 8/1993 | Fredrickson ................ 166/307 |
| 5,244,362 A | 9/1993 | Conally |
| 5,247,059 A | 9/1993 | Gruber et al. ............... 528/354 |
| 5,249,627 A | 10/1993 | Harms et al. |
| 5,249,628 A | 10/1993 | Surjaatmadia .............. 166/305 |
| 5,256,729 A | 10/1993 | Kutts et al. .................. 524/700 |
| 5,265,678 A | 11/1993 | Grundmann |

| Patent No. | Date | Inventor | Class |
|---|---|---|---|
| 5,273,115 A | 12/1993 | Spafford | 166/281 |
| 5,278,203 A | 1/1994 | Harms | |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,756 A | 1/1995 | Northrop et al. | |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,390,741 A | 2/1995 | Payton et al. | |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,403,822 A | 4/1995 | Mueller et al. | |
| 5,420,174 A | 5/1995 | Dewprashad | |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawson et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,177 A | 2/1996 | Yeh et al. | 166/295 |
| 5,492,178 A | 2/1996 | Nguyen et al. | 166/276 |
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,547,023 A | 8/1996 | McDaniel et al. | 166/280 |
| 5,551,513 A | 9/1996 | Surles et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,639,806 A | 6/1997 | Johnson et al. | 523/208 |
| 5,663,123 A | 9/1997 | Goodhue, Jr. et al. | |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,697,448 A | 12/1997 | Johnson | |
| 5,698,322 A | 12/1997 | Tsai et al. | 428/373 |
| 5,701,956 A | 12/1997 | Hardy et al. | |
| 5,712,314 A | 1/1998 | Surles et al. | 521/41 |
| 5,732,364 A | 3/1998 | Kalb et al. | 588/8 |
| 5,738,136 A | 4/1998 | Rosenberg | |
| 5,765,642 A | 6/1998 | Surjaatmadja | 166/297 |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/280 |
| 5,791,415 A | 8/1998 | Nguyen et al. | 166/280 |
| 5,799,734 A | 9/1998 | Norman et al. | 166/278 |
| 5,806,593 A | 9/1998 | Suries | 166/270 |
| 5,830,987 A | 11/1998 | Smith | 528/332 |
| 5,833,000 A | 11/1998 | Weaver et al. | 166/276 |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,836,393 A | 11/1998 | Johnson | |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,901,789 A | 5/1999 | Donnelly et al. | |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,944,106 A | 8/1999 | Dalrymple et al. | |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,784 A | 10/1999 | Ryan | |
| 5,960,877 A | 10/1999 | Funkhouser et al. | 166/270 |
| 5,960,878 A | 10/1999 | Nguyen et al. | |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,969,823 A | 10/1999 | Wurz et al. | |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | 166/300 |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |

| | | | |
|---|---|---|---|
| 6,114,410 A | 9/2000 | Betzold .................. 523/130 |
| 6,123,871 A | 9/2000 | Carroll ................ 252/301.36 |
| 6,123,965 A | 9/2000 | Jacon et al. ............... 424/489 |
| 6,124,246 A | 9/2000 | Heathman et al. ........... 507/219 |
| 6,130,286 A | 10/2000 | Thomas et al. ............. 524/507 |
| 6,131,661 A | 10/2000 | Conner et al. |
| 6,135,987 A | 10/2000 | Tsai et al. ................ 604/365 |
| 6,140,446 A | 10/2000 | Fujiki et al. ............... 528/15 |
| 6,143,698 A | 11/2000 | Murphey et al. |
| 6,148,911 A | 11/2000 | Gipson et al. .............. 166/248 |
| 6,152,234 A | 11/2000 | Newhouse et al. ........... 166/403 |
| 6,162,766 A | 12/2000 | Muir et al. ................ 507/267 |
| 6,165,947 A | 12/2000 | Chang et al. |
| 6,169,058 B1 | 1/2001 | Le et al. .................. 507/222 |
| 6,172,011 B1 | 1/2001 | Card et al. ................ 507/204 |
| 6,172,077 B1 | 1/2001 | Curtis et al. ............... 514/278 |
| 6,176,315 B1 | 1/2001 | Reddy et al. ............... 166/295 |
| 6,177,484 B1 | 1/2001 | Surles ..................... 523/131 |
| 6,184,311 B1 | 2/2001 | O'Keefe et al. ............. 525/438 |
| 6,186,228 B1 | 2/2001 | Wegener et al. |
| 6,187,834 B1 | 2/2001 | Thayer et al. ............... 522/15 |
| 6,187,839 B1 | 2/2001 | Eoff et al. ................. 523/130 |
| 6,189,615 B1 | 2/2001 | Sydansk ................... 166/270 |
| 6,192,985 B1 | 2/2001 | Hinkel et al. .............. 166/280 |
| 6,192,986 B1 | 2/2001 | Urlwin-Smith ............. 166/295 |
| 6,196,317 B1 | 3/2001 | Hardy ..................... 166/295 |
| 6,202,751 B1 | 3/2001 | Chatterji et al. ............ 166/276 |
| 6,209,643 B1 | 4/2001 | Nguyen et al. .............. 166/276 |
| 6,209,644 B1 | 4/2001 | Brunet ..................... 166/297 |
| 6,209,646 B1 | 4/2001 | Reddy et al. ............... 166/300 |
| 6,210,471 B1 | 4/2001 | Craig .................... 106/31.08 |
| 6,214,773 B1 | 4/2001 | Harris et al. ............... 507/271 |
| 6,231,664 B1 | 5/2001 | Chatterji et al. ............ 106/724 |
| 6,234,251 B1 | 5/2001 | Chatterji et al. ............ 166/295 |
| 6,238,597 B1 | 5/2001 | Yim et al. ................. 252/512 |
| 6,241,019 B1 | 6/2001 | Davidson et al. ............ 166/249 |
| 6,242,390 B1 | 6/2001 | Mitchell et al. ............. 507/211 |
| 6,244,344 B1 | 6/2001 | Chatterji et al. ............ 166/295 |
| 6,257,335 B1 | 7/2001 | Nguyen et al. .............. 166/280 |
| 6,260,622 B1 | 7/2001 | Blok et al. ............... 166/305.1 |
| 6,271,181 B1 | 8/2001 | Chatterji et al. ............ 507/219 |
| 6,274,650 B1 | 8/2001 | Cui ........................ 523/457 |
| 6,279,652 B1 | 8/2001 | Chatterji et al. ............ 166/194 |
| 6,279,656 B1 | 8/2001 | Sinclair et al. ............. 166/310 |
| 6,283,214 B1 | 9/2001 | Guinot et al. ............... 166/297 |
| 6,302,207 B1 | 10/2001 | Nguyen et al. .............. 166/276 |
| 6,306,998 B1 | 10/2001 | Kimura et al. ............... 528/12 |
| 6,310,008 B1 | 10/2001 | Rietjens |
| 6,311,773 B1 | 11/2001 | Todd et al. ................ 166/280 |
| 6,315,040 B1 | 11/2001 | Donnelly |
| 6,321,841 B1 | 11/2001 | Eoff et al. ................. 166/291 |
| 6,323,307 B1 | 11/2001 | Bigg et al. ................. 528/354 |
| 6,326,458 B1 | 12/2001 | Gruber et al. .............. 528/354 |
| 6,328,105 B1 | 12/2001 | Betzold .................... 166/280 |
| 6,328,106 B1 | 12/2001 | Griffith et al. .............. 166/295 |
| 6,330,916 B1 | 12/2001 | Rickards et al. ............. 166/280 |
| 6,330,917 B2 | 12/2001 | Chatterji et al. ............ 166/295 |
| 6,342,467 B1 | 1/2002 | Chang et al. |
| 6,350,309 B2 | 2/2002 | Chatterji et al. ............ 106/677 |
| 6,357,527 B1 | 3/2002 | Norman et al. .............. 166/300 |
| 6,364,018 B1 | 4/2002 | Brannon et al. ........... 166/280.2 |
| 6,364,945 B1 | 4/2002 | Chatterji et al. ............ 106/677 |
| 6,367,165 B1 | 4/2002 | Huttlin ..................... 34/582 |
| 6,367,549 B1 | 4/2002 | Chatterji et al. ............ 166/292 |
| 6,372,678 B1 | 4/2002 | Youngsman et al. ......... 504/128 |
| 6,376,571 B1 | 4/2002 | Chawla et al. ............... 522/64 |
| 6,387,986 B1 | 5/2002 | Moradi-Araghi et al. ...... 523/211 |
| 6,390,195 B1 | 5/2002 | Nguyen et al. .............. 166/276 |
| 6,394,181 B2 | 5/2002 | Schnatzmeyer et al. |
| 6,401,817 B1 | 6/2002 | Griffith et al. .............. 166/295 |
| 6,405,796 B1 | 6/2002 | Meyer et al. |
| 6,405,797 B2 | 6/2002 | Davidson et al. ............ 166/249 |
| 6,406,789 B1 | 6/2002 | McDaniel et al. ............ 428/403 |
| 6,408,943 B1 | 6/2002 | Schultz et al. .............. 166/285 |
| 6,415,509 B1 | 7/2002 | Echols et al. |
| 6,422,183 B1 | 7/2002 | Kato |
| 6,422,314 B1 | 7/2002 | Todd et al. ................. 166/312 |
| 6,439,309 B1 | 8/2002 | Matherly et al. ............. 166/276 |
| 6,439,310 B1 | 8/2002 | Scott, III et al. ............. 166/308 |
| 6,440,255 B1 | 8/2002 | Kohlhammer et al. ........ 156/283 |
| 6,446,727 B1 | 9/2002 | Zemlak et al. .............. 166/308 |
| 6,448,206 B1 | 9/2002 | Griffith et al. .............. 507/219 |
| 6,450,260 B1 | 9/2002 | James et al. ................ 166/277 |
| 6,454,003 B1 | 9/2002 | Chang et al. ................ 166/270 |
| 6,457,518 B1 | 10/2002 | Castano-Mears et al. |
| 6,458,885 B1 | 10/2002 | Stengal et al. .............. 524/507 |
| 6,478,092 B2 | 11/2002 | Voll et al. |
| 6,485,947 B1 | 11/2002 | Rajgarhia et al. ............ 435/139 |
| 6,488,091 B1 | 12/2002 | Weaver et al. .............. 166/300 |
| 6,488,763 B2 | 12/2002 | Brothers et al. ............. 106/692 |
| 6,494,263 B2 | 12/2002 | Todd ....................... 166/312 |
| 6,503,870 B2 | 1/2003 | Griffith et al. .............. 507/219 |
| 6,508,305 B1 | 1/2003 | Brannon et al. ............. 166/293 |
| 6,510,896 B2 | 1/2003 | Bode et al. |
| 6,520,255 B2 | 2/2003 | Tolman et al. |
| 6,527,051 B1 | 3/2003 | Reddy et al. ............... 166/300 |
| 6,528,157 B1 | 3/2003 | Hussain et al. .............. 428/325 |
| 6,531,427 B1 | 3/2003 | Shuchart et al. ............. 507/267 |
| 6,534,449 B1 | 3/2003 | Gilmour et al. |
| 6,536,939 B1 | 3/2003 | Blue |
| 6,538,576 B1 | 3/2003 | Schultz et la. ............ 340/859.6 |
| 6,543,545 B1 | 4/2003 | Chatterji et al. ............ 166/381 |
| 6,550,959 B2 | 4/2003 | Huber et al. |
| 6,552,333 B1 | 4/2003 | Storm et al. .............. 250/269.3 |
| 6,554,071 B1 | 4/2003 | Reddy et al. ............... 166/293 |
| 6,555,507 B2 | 4/2003 | Chatterji et al. ............ 507/219 |
| 6,569,814 B1 | 5/2003 | Brady et al. ................ 507/201 |
| 6,582,819 B2 | 6/2003 | McDaniel et al. ............ 428/402 |
| 6,588,926 B2 | 7/2003 | Huber et al. |
| 6,588,928 B2 | 7/2003 | Huber et al. |
| 6,593,402 B2 | 7/2003 | Chatterji et al. .............. 524/7 |
| 6,599,863 B1 | 7/2003 | Palmer et al. ............... 507/219 |
| 6,608,162 B1 | 8/2003 | Chiu et al. ................. 528/129 |
| 6,609,578 B2 | 8/2003 | Patel et al. |
| 6,616,320 B2 | 9/2003 | Huber et al. ............... 366/156.2 |
| 6,620,857 B2 | 9/2003 | Valet ....................... 522/42 |
| 6,626,241 B2 | 9/2003 | Nguyen .................... 166/278 |
| 6,632,527 B1 | 10/2003 | McDaniel et al. ............ 428/402 |
| 6,632,778 B1 | 10/2003 | Ayoub et al. ............... 507/202 |
| 6,632,892 B2 | 10/2003 | Rubinsztajn et al. ......... 525/476 |
| 6,642,309 B2 | 11/2003 | Komitsu et al. ............. 525/100 |
| 6,648,501 B2 | 11/2003 | Huber et al. ................ 366/301 |
| 6,659,179 B2 | 12/2003 | Nguyen .................... 166/227 |
| 6,664,343 B2 | 12/2003 | Narisawa et al. ............ 525/474 |
| 6,667,279 B1 | 12/2003 | Hessert et al. .............. 507/225 |
| 6,668,926 B2 | 12/2003 | Nguyen et al. .............. 166/280 |
| 6,669,771 B2 | 12/2003 | Tokiwa et al. .............. 106/162.7 |
| 6,677,426 B2 | 1/2004 | Noro et al. |
| 6,681,856 B1 | 1/2004 | Chatterji et al. ............ 166/294 |
| 6,686,328 B1 | 2/2004 | Binder ..................... 510/446 |
| 6,705,400 B1 | 3/2004 | Nguyen et al. .............. 166/281 |
| 6,705,440 B2 | 3/2004 | Phelan et al. |
| 6,710,019 B1 | 3/2004 | Sawdon et al. ............. 507/136 |
| 6,713,170 B1 | 3/2004 | Kaneko et al. .............. 428/323 |
| 6,725,926 B2 | 4/2004 | Nguyen et al. ............ 166/254.1 |
| 6,725,930 B2 | 4/2004 | Boney et al. |
| 6,725,931 B2 | 4/2004 | Nguyen et al. ........... 166/280.2 |
| 6,729,404 B2 | 5/2004 | Nguyen et al. ........... 166/280.2 |
| 6,729,405 B2 | 5/2004 | DiLullo et al. |
| 6,732,800 B2 | 5/2004 | Acock et al. ............... 166/308 |
| 6,745,159 B1 | 6/2004 | Todd et al. .................. 703/10 |
| 6,749,025 B1 | 6/2004 | Brannon et al. ........... 166/305.1 |
| 6,763,888 B1 | 7/2004 | Harris et al. ............... 166/305.1 |
| 6,766,858 B2 | 7/2004 | Nguyen et al. .............. 166/300 |
| 6,776,235 B1 | 8/2004 | England |
| 6,776,236 B1 | 8/2004 | Nguyen .................... 166/279 |

| | | | | | | |
|---|---|---|---|---|---|---|
| 6,832,650 B2 | 12/2004 | Nguyen et al. ............... 166/279 | | 2004/0149441 A1 | 8/2004 | Nguyen et al. ............ 166/280.1 |
| 6,832,655 B2 | 12/2004 | Ravensbergen et al. | | 2004/0152601 A1 | 8/2004 | Still et al. .................... 507/100 |
| 6,837,309 B2 | 1/2005 | Boney et al. | | 2004/0152602 A1 | 8/2004 | Boles |
| 6,851,474 B2 | 2/2005 | Nguyen ....................... 166/279 | | 2004/0177961 A1 | 9/2004 | Nguyen et al. ............ 166/280.2 |
| 6,866,099 B2 | 3/2005 | Nguyen | | 2004/0182576 A1 | 9/2004 | Reddy et al. ................. 166/295 |
| 6,881,709 B2 | 4/2005 | Nelson et al. | | 2004/0194960 A1 | 10/2004 | DiLullo et al. |
| 6,887,834 B2 | 5/2005 | Nguyen et al. ............... 507/221 | | 2004/0194961 A1 | 10/2004 | Nguyen et al. ............... 166/295 |
| 6,962,200 B2 | 11/2005 | Nguyen et al. | | 2004/0206499 A1 | 10/2004 | Nguyen et al. ............ 166/280.2 |
| 6,978,836 B2 | 12/2005 | Nguyen et al. ............... 166/295 | | 2004/0211559 A1 | 10/2004 | Nguyen et al. ............... 166/276 |
| 6,997,259 B2 | 2/2006 | Nguyen | | 2004/0211561 A1 | 10/2004 | Nguyen et al. ............ 166/280.2 |
| 7,028,774 B2 | 4/2006 | Nguyen et al. ............... 166/295 | | 2004/0221992 A1 | 11/2004 | Nguyen et al. ............... 166/295 |
| 7,032,667 B2 | 4/2006 | Nguyen et al. | | 2004/0231845 A1 | 11/2004 | Cooke, Jr. .................... 166/279 |
| 7,036,589 B2 | 5/2006 | Nguyen | | 2004/0231847 A1 | 11/2004 | Nguyen et al. ............... 166/295 |
| 7,063,150 B2 | 6/2006 | Slabaugh et al. | | 2004/0256097 A1 | 12/2004 | Byrd et al. ................... 166/90.1 |
| 7,080,688 B2 | 7/2006 | Todd et al. | | 2004/0256099 A1 | 12/2004 | Nguyen et al. ............... 166/249 |
| 7,081,439 B2 | 7/2006 | Sullivan et al. | | 2004/0261993 A1 | 12/2004 | Nguyen |
| 7,093,658 B2 | 8/2006 | Chatterji et al. | | 2004/0261995 A1 | 12/2004 | Nguyen et al. ............... 166/279 |
| 7,117,942 B2 | 10/2006 | Dalrymple et al. | | 2004/0261997 A1 | 12/2004 | Nguyen et al. ............... 166/281 |
| 7,153,575 B2 | 12/2006 | Anderson et al. | | 2004/0261999 A1 | 12/2004 | Nguyen |
| 7,178,596 B2 | 2/2007 | Bblauch et al. | | 2005/0000694 A1 | 1/2005 | Dalrymple et al. |
| 7,204,311 B2 | 4/2007 | Welton et al. | | 2005/0000731 A1 | 1/2005 | Nguyen et al. ................. 175/57 |
| 7,210,528 B1 | 5/2007 | Brannon et al. | | 2005/0006093 A1 | 1/2005 | Nguyen et al. ............... 166/281 |
| 7,216,711 B2 | 5/2007 | Nguyen et al. | | 2005/0006095 A1 | 1/2005 | Justus et al. ................. 166/295 |
| 7,252,146 B2 | 8/2007 | Slabaugh et al. | | 2005/0006096 A1 | 1/2005 | Nguyen et al. ............... 166/295 |
| 7,261,156 B2 | 8/2007 | Nguyen et al. | | 2005/0028976 A1 | 2/2005 | Nguyen |
| 7,264,051 B2 | 9/2007 | Nguyen et al. | | 2005/0028979 A1 | 2/2005 | Brannon et al. |
| 7,264,052 B2 | 9/2007 | Nguyen et al. | | 2005/0034862 A1 | 2/2005 | Nguyen et al. ............... 166/281 |
| 7,267,717 B2 | 9/2007 | Watanabe et al. | | 2005/0034865 A1 | 2/2005 | Todd et al. |
| 7,273,099 B2 | 9/2007 | East, Jr. et al. | | 2005/0045326 A1 | 3/2005 | Nguyen et al. ............... 166/278 |
| 7,281,581 B2 | 10/2007 | Nguyen et al. | | 2005/0045330 A1 | 3/2005 | Nguyen et al. ............... 166/281 |
| 7,306,037 B2 | 12/2007 | Nguyen et al. | | 2005/0045384 A1 | 3/2005 | Nguyen et al. ................. 175/72 |
| 7,343,973 B2 | 3/2008 | Dusterhoft et al. | | 2005/0049151 A1 | 3/2005 | Nguyen et al. ............... 507/203 |
| 2001/0016562 A1 | 8/2001 | Muir et al. ................... 507/201 | | 2005/0051331 A1 | 3/2005 | Nguyen et al. ............ 166/280.2 |
| 2002/0036088 A1 | 3/2002 | Todd | | 2005/0051332 A1 | 3/2005 | Nguyen et al. ............... 166/281 |
| 2002/0043370 A1 | 4/2002 | Poe ........................ 166/250.07 | | 2005/0059555 A1 | 3/2005 | Dusterhoft et al. ........... 507/100 |
| 2002/0048676 A1 | 4/2002 | McDaniel et al. ............ 428/404 | | 2005/0061509 A1 | 3/2005 | Nguyen et al. ............... 166/307 |
| 2002/0070020 A1 | 6/2002 | Nguyen ....................... 166/295 | | 2005/0092489 A1 | 5/2005 | Welton et al. ............. 166/280.2 |
| 2002/0104217 A1 | 8/2002 | Echols et al. | | 2005/0126780 A1 | 6/2005 | Todd et al. |
| 2002/0160920 A1 | 10/2002 | Dawson et al. | | 2005/0139359 A1 | 6/2005 | Maurer et al. |
| 2002/0169085 A1 | 11/2002 | Miller et al. | | 2005/0145385 A1 | 7/2005 | Nguyen et al. ............... 166/279 |
| 2002/0189808 A1 | 12/2002 | Nguyen et al. | | 2005/0173116 A1 | 8/2005 | Nguyen et al. ............ 166/280.2 |
| 2003/0006036 A1 | 1/2003 | Malone et al. ........... 166/250.12 | | 2005/0178551 A1 | 8/2005 | Tolman et al. |
| 2003/0013871 A1 | 1/2003 | Mallon et al. | | 2005/0194135 A1 | 9/2005 | Nguyen et al. |
| 2003/0060374 A1 | 3/2003 | Cooke, Jr. .................... 507/200 | | 2005/0194136 A1 | 9/2005 | Nguyen et al. |
| 2003/0106690 A1 | 6/2003 | Boney et al. | | 2005/0194140 A1 | 9/2005 | Dalrymple et al. |
| 2003/0114314 A1 | 6/2003 | Ballard et al. ................ 507/100 | | 2005/0194142 A1 | 9/2005 | Nguyen et al. ............ 166/280.2 |
| 2003/0114317 A1 | 6/2003 | Benton et al. | | 2005/0207001 A1 | 9/2005 | Laufer et al. |
| 2003/0130133 A1 | 7/2003 | Vollmer ....................... 507/100 | | 2005/0257929 A1 | 11/2005 | Nguyen et al. |
| 2003/0131999 A1 | 7/2003 | Nguyen et al. ............... 166/280 | | 2005/0263283 A1 | 12/2005 | Nguyen et al. ............... 166/281 |
| 2003/0148893 A1 | 8/2003 | Lungofer et al. ............. 507/200 | | 2005/0267001 A1 | 12/2005 | Weaver et al. ................ 507/219 |
| 2003/0186820 A1 | 10/2003 | Thesing ....................... 507/200 | | 2005/0269086 A1 | 12/2005 | Nguyen et al. ............... 166/281 |
| 2003/0188766 A1 | 10/2003 | Banerjee et al. ................... 134/7 | | 2005/0269101 A1 | 12/2005 | Stegent et al. ............. 166/308.2 |
| 2003/0188872 A1 | 10/2003 | Nguyen et al. ............... 166/308 | | 2005/0274510 A1 | 12/2005 | Nguyen et al. ........... 166/250.12 |
| 2003/0196805 A1 | 10/2003 | Boney et al. ................. 166/280 | | 2005/0274517 A1 | 12/2005 | Blauch et al. ............. 166/280.2 |
| 2003/0205376 A1 | 11/2003 | Ayoub et al. ............... 166/254.2 | | 2005/0274520 A1 | 12/2005 | Nguyen et al. |
| 2003/0213113 A1 | 11/2003 | McMillan et al. ........... 29/281.1 | | 2005/0277554 A1 | 12/2005 | Blauch et al. ................ 507/224 |
| 2003/0230408 A1 | 12/2003 | Acock et al. ................. 166/297 | | 2005/0284632 A1 | 12/2005 | Dalrymple et al. |
| 2003/0230431 A1 | 12/2003 | Reddy et al. | | 2005/0284637 A1 | 12/2005 | Stegent et al. ............. 166/308.1 |
| 2003/0234103 A1 | 12/2003 | Lee et al. ...................... 166/293 | | 2006/0048943 A1 | 3/2006 | Parker et al. ............... 166/308.1 |
| 2004/0000402 A1 | 1/2004 | Nguyen et al. ............... 166/280 | | 2006/0048944 A1 | 3/2006 | van Batenburg et al. . 166/308.1 |
| 2004/0014607 A1 | 1/2004 | Sinclair et al. ................ 507/200 | | 2006/0052251 A1 | 3/2006 | Anderson et al. |
| 2004/0014608 A1 | 1/2004 | Nguyen et al. ............... 507/200 | | 2006/0089266 A1 | 4/2006 | Dusterhoft et al. .......... 260/78.3 |
| 2004/0040706 A1 | 3/2004 | Hossaini et al. .............. 166/278 | | 2006/0113078 A1 | 6/2006 | Nguyen et al. |
| 2004/0040708 A1 | 3/2004 | Stephenson et al. ...... 166/280.1 | | 2006/0124303 A1 | 6/2006 | Nguyen et al. ............ 166/280.1 |
| 2004/0040712 A1 | 3/2004 | Ravi et al. | | 2006/0137875 A1 | 6/2006 | Dusterhoft et al. |
| 2004/0040713 A1 | 3/2004 | Nguyen et al. ............... 166/295 | | 2006/0157243 A1 | 7/2006 | Nguyen et al. ............ 166/280.2 |
| 2004/0043906 A1 | 3/2004 | Heath et al. | | 2006/0175058 A1 | 8/2006 | Nguyen et al. ............ 166/280.2 |
| 2004/0045712 A1 | 3/2004 | Eoff et al. | | 2006/0219405 A1 | 10/2006 | Nguyen et al. |
| 2004/0048752 A1 | 3/2004 | Nguyen et al. ............... 507/269 | | 2006/0219408 A1 | 10/2006 | Nguyen et al. |
| 2004/0055747 A1 | 3/2004 | Lee .............................. 166/278 | | 2006/0234874 A1 | 10/2006 | Eoff et al. |
| 2004/0060702 A1 | 4/2004 | Kotlar et al. | | 2006/0240994 A1 | 10/2006 | Eoff et al. |
| 2004/0106525 A1 | 6/2004 | Willbert et al. ............... 507/200 | | 2006/0240995 A1 | 10/2006 | Rickman et al. |
| 2004/0138068 A1 | 7/2004 | Rimmer et al. ............... 507/209 | | 2006/0260810 A1 | 11/2006 | Weaver et al. |

| | | | |
|---|---|---|---|
| 2006/0260813 | A1 | 11/2006 | Welton et al. |
| 2006/0264332 | A1 | 11/2006 | Welton et al. |
| 2006/0266522 | A1 | 11/2006 | Eoff et al. |
| 2006/0283592 | A1 | 12/2006 | Sierra et al. |
| 2006/0289160 | A1 | 12/2006 | van Batenburg et al. |
| 2007/0007010 | A1 | 1/2007 | Welton et al. |
| 2007/0012445 | A1 | 1/2007 | Nguyen et al. |
| 2007/0029087 | A1 | 2/2007 | Nguyen et al. |
| 2007/0114032 | A1 | 5/2007 | Stegent et al. |
| 2007/0131422 | A1 | 6/2007 | Gatlin et al. |
| 2007/0131425 | A1 | 6/2007 | Gatlin et al. |
| 2008/0006406 | A1 | 1/2008 | Nguyen et al. |
| 2009/0253594 | A1 | 10/2009 | Dalrymple et al. |

FOREIGN PATENT DOCUMENTS

| | | | |
|---|---|---|---|
| EP | 0313243 | B1 | 10/1988 |
| EP | 0528595 | A1 | 8/1992 |
| EP | 0643196 | A2 | 8/1992 |
| EP | 0506934 | | 10/1992 |
| EP | 0510762 | A2 | 11/1992 |
| EP | 0834644 | A2 | 4/1998 |
| EP | 0853186 | A2 | 7/1998 |
| EP | 0864726 | A2 | 9/1998 |
| EP | 0879935 | B1 | 11/1998 |
| EP | 0933498 | A1 | 8/1999 |
| EP | 1001133 | A1 | 5/2000 |
| EP | 1132569 | A2 | 9/2001 |
| EP | 1326003 | A1 | 7/2003 |
| EP | 1362978 | A1 | 11/2003 |
| EP | 1394355 | A1 | 3/2004 |
| EP | 1396606 | A2 | 3/2004 |
| EP | 1398640 | A1 | 3/2004 |
| EP | 1403466 | A2 | 3/2004 |
| EP | 1464789 | A1 | 10/2004 |
| EP | 1607572 | | 12/2005 |
| GB | 1107584 | | 3/1968 |
| GB | 1264180 | | 12/1969 |
| GB | 1292718 | | 10/1972 |
| GB | 2298440 | | 9/1996 |
| GB | 2382143 | A | 4/2001 |
| WO | WO 93/15127 | | 8/1993 |
| WO | WO 94/07949 | | 4/1994 |
| WO | WO 94/08078 | | 4/1994 |
| WO | WO 94/08090 | | 4/1994 |
| WO | WO 95/09879 | | 4/1995 |
| WO | WO 97/11845 | | 4/1997 |
| WO | WO 99/27229 | | 6/1999 |
| WO | WO 01/81914 | | 11/2001 |
| WO | WO 01/87797 | A1 | 11/2001 |
| WO | WO 02/12674 | A1 | 2/2002 |
| WO | WO 03/027431 | A1 | 4/2003 |
| WO | WO 2004/009956 | | 1/2004 |
| WO | WO 04/037946 | A1 | 5/2004 |
| WO | WO 04/038176 | A1 | 5/2004 |
| WO | WO 2004/083600 | | 9/2004 |
| WO | WO 2004090281 | | 10/2004 |
| WO | WO2004104368 | | 12/2004 |
| WO | WO 05/021928 | A2 | 3/2005 |
| WO | WO2005080749 | | 9/2005 |
| WO | WO2006103385 | | 10/2006 |
| WO | WO2006116868 | | 11/2006 |

OTHER PUBLICATIONS

Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.

Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.

Halliburton Technical Flier—Multi Stage Frac Completion Methods, 2 pages.

Halliburton "*CobraFrac$^{SM}$ Service, Coiled Tubing Fracturing—Cost-Effective Method for Stimulating Untapped Reserves*", 2 pages.

Halliburton "*CobraJetFrac$^{SM}$ Service, Cost-Effective Technology That Can Help Reduce Cost per BOE Produced, Shorten Cycle time and Reduce Capex*".

Halliburton Cobra Frac Advertisement.

Halliburton "*SurgiFrac$^{SM}$ Service, a Quick and cost-Effective Method to Help Boost Production From Openhole Horizontal Completions*" 2002.

*Halliburton, SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications.

Nguyen et al., *A Novel Approach For Enhancing Proppant Consolidation: Laboratory Testing And Field Applications*, SPE Paper No. 77748, 2002.

SPE 15547, *Field Application of Lignosulfonate Gels To Reduce Channeling*, South Swan Hills Miscible Unit, Alberta, Canada, by O.R. Wagner et al., 1986.

Owens et al., *Waterflood Pressure Pulsing for Fractured Reservoirs* SPE 1123, 1966.

Felsenthal et al., Pressure Pulsing—An Improved Method of Waterflooding Fractured Reservoirs SPE 1788, 1957.

Raza, Water and Gas Cyclic Pulsing Method for Improved Oil Recovery, SPE 3005, 1971.

Peng et al., "Pressure Pulsing Waterflooding in Dual Porosity Naturally Fractured Reservoirs" SPE 17587, 1988.

Dusseault et al, "Pressure Pulse Workovers in Heavy Oil", SPE 79033, 2002.

Yang et al., "Experimental Study on Fracture Initiation By Pressure Pulse", SPE 63035, 2000.

Nguyen et al., New Guidelines For Applying Curable Resin-Coated Proppants, SPE Paper No. 39582, 1997.

Kazakov et al., "Optimizing and Managing Coiled Tubing Frac Strings" SPE 60747, 2000.

Advances in Polymer Science, vol. 157, "Degradable Aliphatic Polyesters" edited by A.-C. Albertson, 2001.

Gorman, Plastic Electric: Lining up the Future of Conducting Polymers Science News, vol. 163, May 17, 2003.

Gidley et al., "Recent Advances in Hydraulic Fracturing," Chapter 6, pp. 109-130, 1989.

Simmons et al., "Poly(phenyllactide): Synthesis, Characterization, and Hydrolytic Degradation, Biomacromolecules", vol. 2, No. 2, pp. 658-663, 2001.

Yin et al., "Preparation and Characterization of Substituted Polylactides", Americal Chemical Society, vol. 32, No. 23, pp. 7711-7718, 1999.

Yin et al., "Synthesis and Properties of Polymers Derived from Substituted Lactic Acids", American Chemical Society, Ch. 12, pp. 147-159, 2001.

Cantu et al., "Laboratory and Field Evaluation of a Combined Fluid-Loss Control Additive and Gel Breaker for Fracturing Fluids," SPE 18211, 1990.

Love et al., "Selectively Placing Many Fractures in Openhole Horizontal Wells Improves Production", SPE 50422, 1998.

McDaniel et al, "Evolving New Stimulation Process Proves Highly Effective In Level 1 Dual-Lateral Completion" SPE 78697, 2002.

Albertsson et al., "Aliphatic Polyesters: Synthesis, Properties and Applications", Advances in Polymer Science, vol. 57 Degradable Aliphatic Polyesters, 2002.

Dechy-Cabaret et al., "Controlled Ring-Operated Polymerization of Lactide and Glycolide" American Chemical Society, Chemical Reviews, A-Z, AA-AD, 2004.

Funkhouser et al., "Synthetic Polymer Fracturing Fluid For High-Temperature Applications", SPE 80236, 2003.

Chelating Agents, Encyclopedia of Chemical Technology, vol. 5 (764-795).

Vichaibun et al., "A New Assay for the Enzymatic Degradation of Polylactic Acid, Short Report", ScienceAsia, vol. 29, pp. 297-300, 2003.

CDX Gas, CDX Solution, 2003, CDX, LLC, Available @www.cdxgas.com/solution.html, printed pp. 1-2.
CDX Gas, "What is Coalbed Methane?" CDX, LLC. Available @www.cdxcias.com/what.html, printed p. 1.
Halliburton brochure entitled "H2Zero™ Service Introducing The Next Generation of cost-Effective Conformance Control Solutions", 2002.
Halliburton brochire entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "Sanfix® A Resin", 1999.
Halliburton brochure entitled "Pillar Frac Stimulation Technique" Fracturing Services Technical Data Sheet, 2 pages.
S.W. Almond et al "Factors Affecting Proppant Flowback with Resin Coated Proppants," Society of Petroleum Engineers, Inc., SPE 30096, pp. 171-186, 1995.
Notice of Allowance dated Sep. 24, 2007 for U.S. Appl. No. 10/862,986.
"Santrol Bioballs", accessed Sep. 30, 2004.
Foreign search report dated Sep. 16, 2004 for application PCT/GB2004/002412.
Foreign search report dated Jul. 31, 2006 for application PCT/GB2005/003845.
Foreign search report dated Jan. 11, 2006 for application PCT/GB2005/004009.
Foreign search report (CPW 21582 EP).
Foreign search report dated Apr. 7, 2003 for application PCT/GB2004/001497.
Foreign search report dated Dec. 10, 2004 for application PCT/GB2004/001842.
Foreign search report dated Dec. 16, 2004 for application PCT/GB2004/002674.
Foreign search report dated Nov. 16, 2004 for application PCT/GB2004/002968.
Foreign search report dated Feb. 10, 2005 for application PCT/GB2004/004242.
Foreign search report dated Jun. 4, 2004 for application PCT/GB2004/000689.
Foreign search report dated Mar. 11, 2005 for application PCT/GB2004/002727.
Foreign search report dated Mar. 11, 2005 for application PCT/GB2004/002747.
Foreign search report dated Feb. 12, 2006 for application PCT/GB2005/004010.
Foreign search report dated Feb. 20, 2007 for application PCT/GB2006/004102.
Foreign search report dated Jun. 5, 2008 for application PCT/GB2006/004137.
Foreign search report dated Mar. 7, 2007 for application PCT/GB2006/004852.
Foreign search report dated Jun. 15, 2007 for application PCT/GB2007/000467.
Foreign search report dated Feb. 6, 2006 for application PCT/GB2006/000366.
Foreign search report dated Dec. 12, 2005 for application PCT/GB2005/003747.
Foreign search report dated May 10, 2007 for application PCT/GB2007/000421.
Foreign search report dated Sep. 3, 2007 for application PCT/GB007/002273.
Foreign search report dated May 24, 2005 for application PCT/GB2004/002948.
Foreign search report dated Jun. 2, 2005 for application PCT/GB2005/000637.
Foreign search report dated Jun. 8, 2005 for application PCT/GB2005/000634.
SPE 17154 "Key Factors for Enhanced Results of Matrix Stimulation Treatments" Paccaloni et al., 1988.
SPE 20623 "Advances in Matrix Stimulation Technology" Paccaloni et al., Mar. 1993.
SPE 82215, Controlling Proppant Flowback in High-Temperature, High-Production Wells. Nguyen et al., May 13, 2003.
SPE 90398, Maximizing Effective Proppant Permeability under High-Stress, High Gas-Rate Conditions. Dusterhoft, R., Nguyen, P., Conway, M., Sep. 26, 2004.
Russian Examination Report for Patent Application No. 2006147010, dated Nov. 20, 2009.

* cited by examiner

METHODS FOR CONTROLLING PARTICULATE MIGRATION

CROSS REFERENCE TO RELATED APPLICATIONS

This application is a continuation of U.S. patent application Ser. No. 10/862,986 filed Jun. 8, 2004 now U.S. Pat. No. 7,299,875, entitled "Methods For Controlling Particulate Migration," by Philip Nguyen, et al., which is incorporated by reference herein for all purposes, from which priority is claimed pursuant to 35 U.S.C. § 120.

BACKGROUND

The present invention relates to methods for controlling the migration of unconsolidated particulates in a subterranean formation. More particularly, the present invention relates to the use of treatment fluids comprising relatively dilute resin compositions for controlling the migration of unconsolidated or weakly consolidated particulates in a portion of a subterranean formation wherein the relatively dilute resin compositions comprise an aqueous dissolvable solvent.

Hydrocarbon wells are often located in subterranean formations that comprise unconsolidated portions, that is, portions of a subterranean formation that contain particulate matter capable of migrating out of the formation with produced fluids. Unconsolidated portions of subterranean formations include those that contain loose particulates that are readily entrained by produced fluids and those wherein the particulates are bonded together with insufficient bond strength to withstand the forces produced by the production of fluids through the zones. The presence of particulate matter, such as sand, in produced fluids may be disadvantageous and undesirable in that such particulates may abrade pumping equipment and other producing equipment and may reduce the fluid production capabilities of the producing portions of the subterranean formation.

One method of controlling unconsolidated particulates involves placing a filtration bed of gravel near the well bore to prevent the transport of unconsolidated formation particulates with produced fluids. Typically, such operations are referred to as "gravel packing operations," and they usually involve pumping and placing a quantity of particulates adjacent to a portion of an unconsolidated formation so as to form a gravel pack between the open well bore and the formation walls. Although used frequently, such methods can be time-consuming and expensive to perform.

Another conventional method used to control loose formation particulates in unconsolidated formations involves consolidating a portion of a subterranean formation from which the unconsolidated particulates tend to flow by applying a curable resin composition to that portion. In one example of such a technique, an operator pre-flushes the formation, applies a resin composition, and then applies an after-flush fluid to remove excess resin from the pore spaces within the formation. Such resin consolidation methods, however, have not been practicable on formations containing reactive mineral clays such as smectite and kaolinite. Resin consolidating treatments performed on such reactive clay-laden formations tend to yield little or no improvement in consolidation strength and/or may cause significant loss of permeability.

SUMMARY OF THE INVENTION

The present invention relates to methods for controlling the migration of unconsolidated particulates in a subterranean formation. More particularly, the present invention relates to the use of treatment fluids comprising relatively dilute resin compositions for controlling the migration of unconsolidated or weakly consolidated particulates in a portion of a subterranean formation wherein the relatively dilute resin compositions comprise an aqueous dissolvable solvent.

One embodiment of the present invention provides a method of stabilizing a portion of a subterranean formation comprising contacting the portion of the subterranean formation with a pre-flush fluid; contacting the portion of the subterranean formation with a consolidation fluid comprising a resin and an aqueous dissolvable solvent; and, contacting the portion of the subterranean formation with an after-flush fluid.

Another embodiment of the present invention provides a method of reducing the production of particulates from a portion of a subterranean formation comprising contacting the portion of the subterranean formation with a pre-flush fluid; contacting the portion of the subterranean formation with a consolidation fluid comprising a resin and an aqueous dissolvable solvent; and, contacting the portion of the subterranean formation with an after-flush fluid.

Another embodiment of the present invention provides a method of fracturing a portion of a subterranean formation while controlling particulates comprising contacting the portion of the subterranean formation with a pre-flush fluid; contacting the portion of the subterranean formation with a consolidation fluid comprising a resin and an aqueous dissolvable solvent; and, contacting the portion of the subterranean formation with a fracturing fluid at a pressure sufficient to create or enhance a fracture in the subterranean formation.

Other and further features and advantages of the present invention will be readily apparent to those skilled in the art upon a reading of the description of preferred embodiments which follows.

DESCRIPTION OF PREFERRED EMBODIMENTS

The present invention relates to methods for controlling the migration of unconsolidated particulates in a subterranean formation. More particularly, the present invention relates to the use of treatment fluids comprising relatively dilute resin compositions for controlling the migration of unconsolidated or weakly consolidated particulates in a portion of a subterranean formation wherein the relatively dilute resin compositions comprise an aqueous dissolvable solvent.

Some embodiments of the present invention provide improved methods for preventing the migration of unconsolidated particulates within chosen portions of subterranean formations, particularly in portions surrounding a fracture or other void space such as a well bore. Some methods of the present invention comprise contacting a portion of a subterranean formation with a pre-flush fluid, followed by a consolidation fluid diluted with an aqueous dissolvable solvent, followed by an after-flush fluid.

Some methods of the present invention are particularly well suited, inter alia, for use in consolidating unconsolidated particulates in a portion of a formation that includes reactive mineral clays. In particular, embodiments of the present invention may be well suited for portions of subterranean formations comprising at least about 0.1 weight % reactive mineral clay, and particularly well suited for portions of subterranean formations comprising at least about 1 weight % reactive mineral clay.

Pre-flush fluids suitable for use in the methods of the present invention may comprise any combination of an aqueous liquid, a surfactant, and a glycol ether solvent. That is, in some embodiments, the pre-flush fluid may comprise an aqueous liquid and a surfactant, in other embodiments, the pre-flush fluid may comprise a glycol ether, in still other embodiments the pre-flush fluid may comprise an aqueous solvent, a surfactant, and a glycol ether. Other potential combinations of an aqueous liquid, a surfactant, and a glycol ether solvent are also suitable. The pre-flush fluid, inter alia, readies the formation to receive the consolidation fluid and aids in removing oils that may impede the consolidation fluid from making contact with formation particulates.

In pre-flush fluids comprising an aqueous liquid, the aqueous liquid may comprise fresh water, salt water (e.g., water containing one or more salts dissolved therein), brine (e.g., saturated salt water), seawater, or any other aqueous liquid that does not adversely react with the other components used in accordance with the methods of the present invention. A preferred aqueous component of a pre-flush fluid is a brine.

Where the pre-flush fluid comprises a surfactant, any surfactant compatible with the aqueous liquid and capable of aiding the consolidation fluid in coating the surfaces of the unconsolidated particles may be suitable for use in the present invention. Suitable such surfactants include, but are not limited to, ethoxylated nonyl phenol phosphate esters, one or more cationic surfactants, and one or more non-ionic surfactants and an alkyl phosphonate surfactant. Mixtures of one or more cationic and nonionic surfactants also may be suitable. Examples of such surfactant mixtures are described in U.S. Pat. No. 6,311,773 issued to Todd et al. on Nov. 6, 2001, the relevant disclosure of which is incorporated herein by reference. A $C_{12}$-$C_{22}$ alkyl phosphonate surfactant is preferred. While surfactants chosen to aid in coating the formation particulates will generally be cationic, mixtures of surfactants comprising non-ionic surfactants, anionic surfactants, or combinations thereof may be desirable in some embodiments to aid in fluid compatibility. For example, mixtures of surfactants may be beneficial in preventing the formation of viscous, damaging emulsions that may otherwise may form when the relatively dilute resin compositions of the present invention contact the formation fluids.

Where the pre-flush fluid comprises a glycol ether, any glycol ether capable of aiding the consolidation fluid in coating the surfaces of the unconsolidated particles may be suitable for use in the present invention. Suitable such glycol ethers include, but are not limited to, diethylene glycol methyl ether, dipropylene glycol methyl ether, 2-butoxy ethanol, ethers of a $C_2$ to $C_6$ dihydric alkanol that comprise at least one $C_1$ to $C_6$ alkyl group, mono ethers of dihydric alkanols, methoxypropanol, butoxyethanol, hexoxyethanol, isomers thereof, and combinations thereof.

Consolidation fluids suitable for use in the present invention comprise an aqueous dissolvable solvent and a suitable resin. Suitable consolidation fluids are capable of imparting consolidation strength to the formation without substantially affecting the formation's permeability or the producability of desired fluids. The viscosity of the consolidation fluid should preferably be controlled to ensure that it is able to sufficiently penetrate the unconsolidated portions of the subterranean formation. For example, where the portion of the subterranean formation being consolidated is a portion neighboring a well bore, from about 3 inches to about 1.5 feet of penetration into the portion neighboring the well bore may be desired. Where the portion of the subterranean formation being consolidated is a portion neighboring a propped fracture, for example, at least about 0.25 inches of penetration into a neighboring fracture wall may be sufficient. To achieve these penetration levels, the viscosity of the consolidation fluid is important. Generally speaking, the consolidation fluid viscosity may be kept below 100 cP, more preferably below 40 cP, and most preferably below 10 cP; wherein the viscosity is measured at room temperature, using a Brookfield DV-II viscometer, with a No. 2 spindle at 100 RPM.

Achieving the desired viscosity will generally dictate a resin to aqueous dissolvable solvent ratio ranging from about 1:0.2 to about 1:20, preferably from about 1:1 to about 1:3. It is within the ability of one skilled in the art, with the benefit of this disclosure, to use a sufficient amount of a suitable aqueous dissolvable solvent to achieve the desired viscosity for the consolidation fluid and, thus, to achieve a desired degree of penetration into the subterranean formation.

Selection of an appropriate aqueous dissolvable solvent is an important component of the present invention. While prior resin-based consolidation treatments have not been able to impart significant consolidation strength to many formations, particularly formations containing reactive mineral clays, careful selection of a solvent renders consolidation of such formations achievable. While traditional consolidation treatments use high flash point solvents that are not readily dissolvable in aqueous fluids, the methods of the present invention dilute a consolidating resin with an aqueous dissolvable solvent. Suitable aqueous dissolvable solvents, inter alia, tend to enhance the removal of an aqueous phase of fluid surrounding the formation particulates and to allow the diluted resin to coat the particulates while absorbing onto the particulate surfaces.

Any aqueous dissolvable solvent that is compatible with the other consolidating fluid components and that achieves the desired viscosity effect is suitable for use in the present invention. Such aqueous dissolvable solvents include, but are not limited to, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin composition chosen and is within the ability of one skilled in the art with the benefit of this disclosure.

Suitable consolidation fluids include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is preferred to trigger curing.

After-flush fluids suitable for use in the methods of the present invention may be either aqueous liquids or inert gases.

Where the after-flush fluid is an aqueous liquid, it may be salt water, brine, or any other aqueous liquid that does not adversely react with the other components used in accordance with this invention. A preferred aqueous after-flush fluid solution is brine. A volume of about 1 to about 5 times the volume of the consolidation fluid used is generally a suitable volume of after-flush fluid. In some subterranean formations, particularly gas-producing subterranean formations, it may be advantageous to after-flush using an inert gas, such as nitrogen, rather than an aqueous solution to prevent interaction between the after-flush fluid and the formation. The after-flush fluid acts, inter alia, to displace the curable resin from the well bore and to remove curable resin from the pore spaces inside the subterranean formation, thereby restoring permeability while leaving behind resin at the contact points between formation particulates.

One embodiment of the methods of the present invention of stabilizing a portion of a subterranean formation comprises the steps of applying a consolidation fluid diluted with an aqueous dissolvable solvent to the portion of the subterranean formation, and applying an after-flush fluid to the portion of the subterranean formation.

Another embodiment of the methods of the present invention for reducing the production of particulates from a portion of a subterranean formation comprises the steps of applying a consolidation fluid diluted with an aqueous dissolvable solvent to the portion of the subterranean formation, and applying an after-flush fluid to the portion of the subterranean formation.

The methods of the present invention also may be used to consolidate fracture faces before proppant is placed in those fractures. Such methods comprise applying a consolidation fluid diluted with an aqueous dissolvable solvent to a portion of a subterranean formation as a pre-pad or pad, placing an after-flush fluid to the portion of the subterranean formation, and then placing a fracturing fluid into the subterranean formation at a pressure sufficient to create or enhance at least one fracture therein. In such methods, a portion of the fracturing fluid that leaks off into the formation during the fracturing treatment may provide an effective means of over-displacing the resin from the pore space, and thus, a separate after-flush may not be necessary.

Once a method of the present invention is complete, the resin should be allowed time to cure. The required time will depend on the consolidation fluid used, the temperature of the portion of the formation, and the unconfined compressive strength (UCS) needed in the particular application. Generally, the cure time will be between about 0.5 hours and about 72 hours, preferably between about 6 hours and about 48 hours. Determining the proper cure time is within the ability of one skilled in the art with the benefit of this disclosure.

To facilitate a better understanding of the present invention, the following examples of some of the preferred embodiments are given. In no way should such examples be read to limit, or define, the scope of the invention.

EXAMPLES

Unconsolidated cores were prepared in 1-inch inner diameter, 5-inch long Teflon sleeves. Some of the cores comprised Brazos River sand, others comprised mixtures of 70/170-mesh sand, silica flour, and either kaolin or smectite clay. The chosen core material was packed between 0.5-inch 40/60-mesh sand packs and 80-mesh stainless steel metal screens.

A low-viscosity curable resin was prepared by combining one part hardenable resin component and one part hardening agent component to create a two-component epoxy consolidation fluid, and then combining one part of the two-component epoxy consolidation fluid with one part methanol (an aqueous dissolvable solvent).

The unconsolidated cores were first treated with 5% $NH_4Cl$ brine containing 0.5% non-ionic surfactant. During that treatment, the initial permeability of each of the cores was calculated. Next, the low-viscosity curable resin was applied to the unconsolidated core from the top of the core. Finally, an after-flush of 5% $NH_4Cl$ brine was applied to the core in the same direction. The cores were allowed to cure for 24 hours at 200° F.

After the cure time had lapsed, a mixture of 5% $NH_4Cl$ brine was again applied to the cores in the direction from the bottom of the core to determine the retained permeability of the treated cores. Consolidated cores of top and bottom portions of the cores were obtained and tested to determine their unconfined compressive strengths (UCS).

Table 1 below displays the consolidation and permeability results of these tests. These results appear to indicate that unconsolidated core materials are transformed into permeable consolidated masses, regardless of the amount of clay existing in the core materials. However, as the clay content increases, the permeability of packed core decreases. The top portion of the core tends to have lower UCS value than that of the bottom portion. This may indicate that the resin is displaced from the pore spaces in the direction from the top portion downward, and as a result of displacement, more resin is moving toward the bottom portion of the core.

TABLE 1

| Core Composition | Approx. Resin Volume (cc) | Top UCS (psi) | Bottom UCS (psi) | Initial Permeability | Treated Permeability |
|---|---|---|---|---|---|
| Brazos River sand | 80 | 100 | 280 | 1120 | 1190 |
| Brazos River sand | 80 | 370 | 720 | 850 | 470 |
| Brazos River sand | 40 | 40 | 230 | 1060 | 960 |
| 70/170-mesh sand | 80 | 210 | 2470 | 6910 | 6140 |
| 90 weight % 70/170-mesh sand, and 10 weight % silica flour | 80 | 500 | 1260 | 335 | 370 |
| 88 weight % 70/170-mesh sand, 10 weight % silica flour, and 2 weight % kaoline clay | 80 | 1220 | 1240 | 55 | 220 |
| 85 weight % 70/170-mesh sand, | 80 | 3020 | 3520 | 15 | 110 |

TABLE 1-continued

| Core Composition | Approx. Resin Volume (cc) | Top UCS (psi) | Bottom UCS (psi) | Initial Permeability | Treated Permeability |
|---|---|---|---|---|---|
| 80 weight % 70/170-mesh sand, 10 weight % silica flour, and 5 weight % kaoline clay | 80 | 4790 | 4300 | 10 | <5 |
| 88 weight % 70/170-mesh sand, 10 weight % silica flour, and 10 weight % kaoline clay | 80 | 305 | 1270 | 295 | 655 |
| 85 weight % 70/170-mesh sand, 10 weight % silica flour, and 2 weight % smectite clay | 40 | 225 | 270 | 240 | 85 |
| 80 weight % 70/170-mesh sand, 10 weight % silica flour, and 5 weight % smectite clay | 40 | — | 223 | 75 | 20 |
| 80 weight % 70/170-mesh sand, 10 weight % silica flour, and 10 weight % smectite clay | | | | | |

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method comprising:
   (a) first contacting a portion of a subterranean formation with a pre-flush fluid;
   (b) next contacting the portion of the subterranean formation with a consolidation fluid comprising a resin and an aqueous dissolvable solvent that comprises at least one component selected from the group consisting of: methanol, isopropanol, butanol, 2-butoxy ethanol, methoxypropanol, butoxyethanol, hexoxyethanol, any isomer thereof, and any combination thereof; and,
   (c) then contacting the portion of the subterranean formation with an after-flush fluid.

2. The method of claim 1 further comprising the step of, after contacting the portion of the subterranean formation with an after-flush fluid, allowing the resin to substantially cure.

3. The method of claim 1 wherein the portion of the subterranean formation comprises at least about 0.1 weight % reactive mineral clay.

4. The method of claim 1 wherein the portion of the subterranean formation comprises an area surrounding a fracture.

5. The method of claim 1 wherein the pre-flush fluid comprises at least one component chosen from an aqueous liquid, a surfactant, a glycol ether, and a combination thereof.

6. The method of claim 5 wherein the surfactant comprises at least one component chosen from an ethoxylated nonyl phenol phosphate ester, a cationic surfactant, a non-ionic surfactant, an alkyl phosphonate surfactant, and a combination thereof.

7. The method of claim 5 wherein the glycol ether comprises at least one component selected from the group consisting of: diethylene glycol methyl ether, dipropylene glycol methyl ether, 2-butoxy ethanol, an ether of a $C_2$ to $C_6$ dihydric alkanol containing at least one $C_1$ to $C_6$ alkyl group, a mono ether of a dihydric alkanol, methoxypropanol, butoxyethanol, hexoxyethanol, any isomer thereof, and any combination thereof.

8. The method of claim 1 wherein the consolidation fluid has a viscosity of below about 100 cP.

9. The method of claim 1 wherein the hardenable resin comprises at least one resin selected from the group consisting of: a two component epoxy based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resins, a hybrid polyester resin, a copolymer-polyester resin, a polyurethane resin, a hybrid polyurethane resin, a copolymer-polyurethane resin, an acrylate resin, and any combination thereof.

10. The method of claim 1 wherein the after-flush fluid comprises at least one component chosen from salt water, brine, and an inert gas.

11. The method of claim 1 wherein the consolidation fluid further comprises at least one catalyst.

12. A method of reducing the production of particulates from a portion of a subterranean formation comprising:
   (a) first contacting the portion of the subterranean formation with a pre-flush fluid;
   (b) next contacting the portion of the subterranean formation with a consolidation fluid comprising a resin and an aqueous dissolvable solvent that comprises at least one component selected from the group consisting of: methanol, isopropanol, butanol, 2-butoxy ethanol, methoxypropanol, butoxyethanol, hexoxyethanol, any isomer thereof, and any combination thereof; and,
   (c) then contacting the portion of the subterranean formation with an after-flush fluid.

13. The method of claim 12 further comprising the step of, after contacting the portion of the subterranean formation with an after-flush fluid, allowing the resin to substantially cure so as to reduce the production of particulates from the portion of the subterranean formation.

14. The method of claim 12 wherein the portion of the subterranean formation comprises an area surrounding a fracture.

15. A method of stabilizing a portion of a subterranean formation comprising:

(a) first contacting a portion of a subterranean formation with a pre-flush fluid;
(b) next contacting the portion of the subterranean formation with a consolidation fluid comprising a resin and an aqueous dissolvable solvent that comprises at least one component selected from the group consisting of: methanol, isopropanol, butanol, 2-butoxy ethanol, methoxypropanol, butoxyethanol, hexoxyethanol, any isomer thereof, and any combination thereof;
(c) then contacting the portion of the subterranean formation with an after-flush fluid; and
(d) allowing the resin to substantially cure so as to at least partially stabilize the portion of a subterranean formation.

16. The method of claim 15 wherein the portion of the subterranean formation comprises an area surrounding a fracture.

17. The method of claim 15 wherein the consolidation fluid further comprises at least one catalyst.

* * * * *